(Model.)
I. F. LEIBY.
NUT LOCK.
No. 402,023. Patented Apr. 23, 1889.
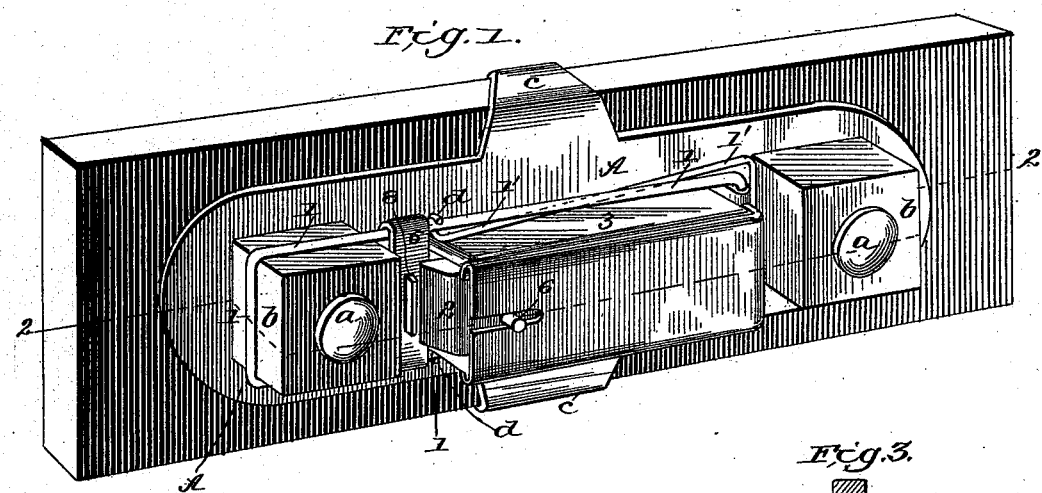
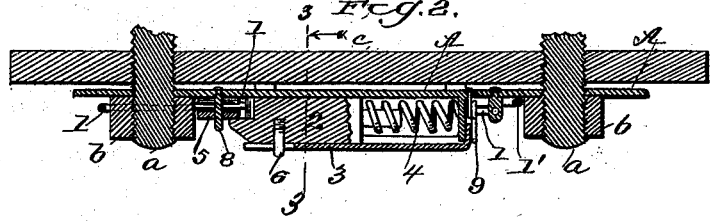
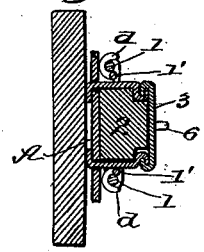
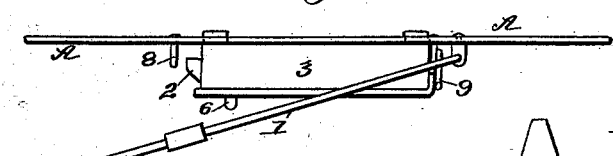
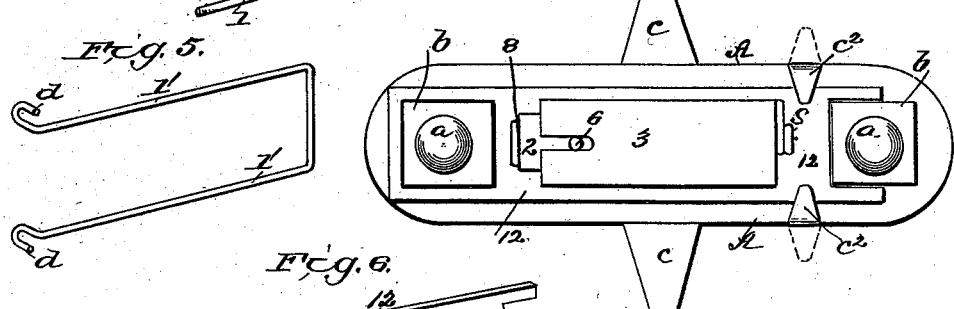
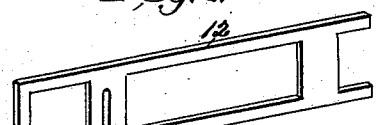
WITNESSES:
Fred G. Dieterich
Amos W. Hart
INVENTOR:
Isaac F. Leiby
BY Munn & Co.
ATTORNEYS.
N. PETERS, Photo-Lithographer, Washington, D. C.

UNITED STATES PATENT OFFICE.

ISAAC F. LEIBY, OF BAIRD, TEXAS.

NUT-LOCK.

SPECIFICATION forming part of Letters Patent No. 402,023, dated April 23, 1889.

Application filed September 17, 1888. Serial No. 285,657. (Model.)

*To all whom it may concern:*

Be it known that I, ISAAC F. LEIBY, of Baird, in the county of Callahan and State of Texas, have invented certain new and useful Improvements in Nut-Locks, of which the following is a specification.

My invention is an improvement in that class of nut-locks in which the locking device consists of a wire or rod bent into the form of a rectangular loop and hinged to a plate secured beneath the nuts to be locked, so that when the loop is parallel to said plate it embraces one or more of such nuts and prevents them from rotating.

The features constituting my improvement are hereinafter described in connection with others and specially indicated in the claims.

In the accompanying drawings, Figure 1 is a perspective view of the preferred form of my nut-locking device as applied in practical use. Fig. 2 is a longitudinal section on line 2 2 of Fig. 1. Fig. 3 is a cross-section on line 3 3 of Fig. 2. Fig. 4 is a plan view of the foundation-plate and the locking wire loop hinged to it. Fig. 5 is a perspective view of the supplementary locking device. Fig. 6 is a perspective view of a modification of the locking device proper. Fig. 7 is a face view showing the same practically applied. Fig. 8 is a face view of a modification of the foundation-plate.

I will first describe the invention exhibited as a whole in Fig. 1 and in detail in Figs. 2, 3, 4, and 5.

While I show my invention as applied to the nuts of a railway-rail fish-plate, it is of course applicable to others as well.

The letter A indicates a part which I propose to term the "foundation-plate." It has holes to receive the bolts $a$ of the nuts $b$, by which it is secured in place on the fish-plate, and in some cases I provide it with lateral extensions $c$, which constitute claws adapted to be bent over and thus clasp the edges of the fish-plate, as shown.

The main nut-locking device 1 is constructed of a stout wire or small rod and has the form of an oblong rectangular loop. This loop is hinged at one end to the said foundation-plate A at a point between the bolt-holes in the latter, but nearer the right-hand one than the other, so that when folded flat on the plate its free end embraces the left-hand nut and locks it. To hold it in this locking position, I employ the spring-catch 2, which consists of a bar sliding in a socket, 3, and held normally projected therefrom by means of a spring, 4, placed behind it in the said socket. The outer end or "nose" of the catch 2 is beveled to adapt it (when the loop 1 is passed over the nut) to be forced back by and thus automatically engage with a cross-piece, 5, which is rigidly attached to the loop-formed device 1, as shown.

The socket 3 is permanently attached to the plate A at a point equidistant between the nuts $b$ and within the space inclosed by the loop 1 when folded in position to lock a nut. The said cross-piece 5 is arranged on the loop 1, so that when the latter is folded it occupies the space between the beveled end of the catch and the adjacent nut.

The catch 2 has a projecting thumb or finger piece, 6, for use in pressing it back against the tension of the spring in the socket. When this is done, the nose of the catch will free the cross-piece and allow the loop 1 to be raised, as shown, Fig. 4, so as to release the nut.

The loop 1 will lock one or more nuts on the left hand. To lock the nut on the right, I employ the supplementary device 1', (shown detached in Fig. 5,) consisting of a stout wire or small rod, which is bent into the form of a clevis and embraces the hinge of the looped device 1 and the socket 3, and having its ends bent laterally, thus forming hooks $d'$, adapted to receive the side bars of loop 1 when the latter is in the locking position shown in Figs. 1 and 2. The arms of the device then lie under the loop 1, so that it is held in place by the latter. The square or angular end of said device 1' is shown parallel to and in contact with the side of the right-hand nut and the hooked ends $d$ in contact with the cross-piece 5, so that the device 1' prevents the said nut from turning.

It will be seen that the nut-locking device 1 and the catch 2 are permanent connections of the foundation-plate A; that they can all be sold, shipped, and practically applied as one device. The device 1' may also be attached and sold with them.

To apply the device, the nuts $b$ are removed and the plate A put in place, the bolts $a$ passing through the holes in the same. Then the nuts b are screwed home and the loop 1 forced over the left-hand nut, whereby the catch 2 engages and locks it automatically, and the supplementary locking device 1' is also secured in the position required to hold the right-hand nut, all as shown in Fig. 1. As an additional security for holding the cross-piece in proper place on loop 1, I provide it with a slot which receives a lug, 8, projecting from the face of plate A, Figs. 1, 2, and 4.

As sand will tend to accumulate in socket 3, I make the cover of the same detachable, it having side flanges forming hooks that engage lateral flanges, Fig. 3, of the sides of the socket. The right-hand end, Fig. 2, of the cover is bent downward, and a spring-finger, 9, engages it and holds the cover in place. By pressing down the said finger the cover may be slid off and the sand removed from the socket. The spring 9 is a permanent attachment of the foundation-plate A.

In Fig. 6 I show a device, $1^2$, made of malleable iron and designed to serve as a substitute for the wire loop 1. To aid in holding it in place on plate A, I make use of lateral projections or fingers $c^2$, formed on the said plate, and which are in practice bent inward, as shown in Fig. 7.

In Fig. 8 I show a modification of the foundation-plate, the same, A, being made of half-length and provided with a hole through which a nail may be inserted to aid in holding the plate in place when used on a wood foundation.

What I claim is—

1. The combination, with the loop-formed nut-locking device and the plate to which it is hinged, of the supplementary locking device, consisting of a wire or rod having one end bent at right angles and embracing the hinge of the main device and its other end provided with a hook to receive the side bar of the main device, as shown.

2. The combination, with the foundation-plate and the loop-formed nut-locking device 1, having the cross-piece 5 and hinged to said plate, as specified, of the supplementary locking device 1', having one end bent laterally to adapt it to bear against a nut and its other end bent downward and abutting the said cross-piece, as shown and described.

ISAAC F. LEIBY.

Witnesses:
D. RICHARDSON,
W. A. HINDS.